Patented July 26, 1949

2,477,552

UNITED STATES PATENT OFFICE 2,477,552

ISOLATION OF CROSS-LINKED POLYMERS

Harold Wittcoff, Minneapolis, Minn., assignor to General Mills, Inc., a corporation of Delaware No Drawing. Application April 25, 1947, Serial No. 744,038

4 Claims. (Cl. 260—338)

The present invention relates to a process of isolating from a reaction mixture medium molecular weight polyether alcohols resulting from the condensation of polyhydroxy compounds with polyfunctional alkylating agents.

In the copending application of Wittcoff and Roach, Serial No. 705,489, filed October 24, 1946, entitled Polyhydric alcohols, there is disclosed the preparation of highly functional polyhydric alcohols by condensing polyhydroxy compounds with polyfunctional alkylating agents. The alcohols which are produced probably possess cross-linkages which result from the cross-condensations. In order for this high degree of condensation to occur, it is necessary that the total number of groups entering into the alkylation reaction be at least 5. Thus the alcohol may contain 3 hydroxyl groups, as for example, glycerin, and the alkylating agent may contain 2 alkylating groups as in the case of glycerol dichlorohydrin. It is also possible to rely on the hydroxyl group of the glycerol dichlorohydrin as one of the groups entering the alkylation reaction. Under these conditions, highly functional polyhydric alcohols are obtained which probably contain cross-linkages. It has been found that these cross-linked alcohols make excellent drying oils, alkyd resins, allyl ethers, rosin acid esters, and the like. However, as these polyhydric alcohols are produced in accordance with the disclosure of the above referred to application, they contain, in addition to the highly condensed alcohols, a certain amount of the original polyhydroxy compound, as well as some relatively low molecular weight linear ether alcohols which result from this condensation.

For the production of the best drying oils, alkyd resins, ester gums, and the like, it is desirable that the highly condensed alcohols be as free as possible from the original reactants and from the low molecular weight ether alcohols. The usual methods of separation, however, are not feasible. For example, distillation is unsatisfactory, for although some monomeric material such as glycerol may be distilled off, the low molecular weight ether alcohols are too high-boiling to be distilled, and cannot be separated from the highly condensed alcohols. Similarly, derivatives such as the acetates or the allyl ethers are not distillable.

It was found, however, that it is possible to convert the original polyhydroxy compound and the low molecular weight ether alcohols to acetals without so converting the highly condensed alcohols. For some reason or other, the highly condensed alcohols do not form acetals. The acetals are soluble in acetone, whereas the highly condensed alcohols are insoluble, and in this way it is possible to separate the original alcohols and the linear ether alcohols as a mixture from the highly condensed alcohols.

In general the invention is carried out by treating the reaction mixture resulting from the condensation of the polyhydroxy compound and polyfunctional alkylating agent, with methanol and hydrochloric acid to neutralize the alkaline catalyst. Thereafter the mixture is evaporated to dryness and the organic material may be extracted with a suitable solvent, such as methanol. This solution is then separated from the residual inorganic material and the alcohol evaporated to leave a viscous syrup. This viscous syrup is then converted to an acetal in the conventional manner, as for example by treating it with acidified acetone, such as a mixture of acetone and anhydrous hydrogen chloride. The reaction proceeds readily and two phases are obtained. The upper phase consisting of acetone and acetals may be decanted, leaving the highly condensed polyhydric alcohols behind. The acetals may, of course, be converted to the alcohols readily by conventional procedures.

The following example will serve to illustrate the invention:

Example

Glycerol (95%, 485 parts) and aqueous sodium hydroxide (34.9%, 1260 parts) were heated to 90° C. and glycerol dichlorohydrin (645 parts) was added with stirring over a period of five hours. The reaction was allowed to continue for two hours more, after which it was cooled, diluted with methanol and neutralized with hydrochloric acid. The mixture was filtered and the filtrate evaporated to yield a mixture of salt and product from which the latter was extracted with methanol. After the removal of methanol, there resulted a syrup from which most of the excess glycerol was removed by distillation. This, however, is not necessary since it can be removed readily later as the acetone derivative. The final product had a hydroxyl content of 27.3%.

This condensation product (200 parts) was mixed with acetone (1000 parts) which contained 19 parts of anhydrous hydrogen chloride. The mixture was shaken and cooled externally. Thereafter, sodium sulfate (150 parts) was added and the mixture was stirred overnight. This long period of reaction, however, is not necessary, and ordinarily a few hours are sufficient.

The acetone was decanted. It contained the isopropylidene derivatives of some glycerol which was not previously removed and of polyglycerols above diglycerol. This was not the desired product. However, it was recovered by neutralizing the solution with alcoholic caustic and removing the acetone. The residue (142 parts) could be hydrolyzed to obtain the free hydroxy compounds.

The desired product which was the highly condensed polyether alcohol was obtained from the residue remaining after the decantation of the acetone. This residue was treated with methanol, heated slightly and filtered. Evaporation of the filtrate yielded 86 parts of product with a hydroxyl content of 21.6%.

In order to determine the molecular weight, this product was converted to the acetate. The molecular weight of the acetate, determined by the rise of boiling point of carbon tetrachloride and of ethylene dibromide, was 1256.6. Thus the molecular weight of the free hydroxy compound was 819.

While various modifications of the above invention have been described, it is to be understood that the same is not limited thereto, but may be varied within the scope of the following claims.

I claim as my invention:

1. Process of separating highly condensed cross-linked polyether alcohols from a mixture resulting from the alkaline condensation of glycerol and glycerol dichlorohydrin, said mixture containing highly condensed cross-linked polyether alcohols, glycerol and linear polyether alcohols which comprises vaporizing residual glycerol, treating the residue with acidified acetone to convert alcohols other than the highly condensed polyether alcohols to acetals, and separating the acetals from the highly condensed cross-linked polyether alcohols.

2. Process of separating highly condensed cross-linked polyether alcohols from a mixture resulting from the alkaline condensation of glycerol and glycerol dichlorohydrin, said mixture containing highly condensed cross-linked polyether alcohols, glycerol and linear polyether alcohols which comprises treating the mixture with an acidified low aliphatic carbonyl-containing compound to convert alcohols other than the highly condensed polyether alcohols to acetals to form two phases, one containing the carbonyl-containing compound and the acetals, the other containing the highly condensed cross-linked polyether alcohols, and separating the one phase from the other.

3. Process of separating highly condensed cross-linked polyether alcohols from a mixture resulting from the alkaline condensation of glycerol and glycerol dichlorohydrin, said mixture containing highly condensed cross-linked polyether alcohols, glycerol and linear polyether alcohols which comprises treating the mixture with acidified acetone under anhydrous conditions to convert alcohols other than the highly condensed polyether alcohols to acetals and to form two phases, one containing acetone and the acetals, the other containing the highly condensed cross-linked polyether alcohols, and separating the two phases.

4. Process of separating highly condensed cross-linked polyether alcohols from an aqueous reaction mixture resulting from the alkaline condensation of glycerol and glycerol dichlorohydrin, said mixture containing highly condensed cross-linked polyether alcohols, glycerol and linear polyether alcohols which comprises removing water from the reaction mixture to leave a residue, extracting the residue with methanol, evaporating the methanol, treating the remainder with acetone acidified with anhydrous hydrogen chloride, to convert alcohols other than the highly condensed polyether alcohols to acetals and to form two phases, one containing the acetone and the acetals, the other containing the highly condensed cross-linked polyether alcohols, and separating the two phases.

HAROLD WITTCOFF.

REFERENCES CITED

The following references are of record in the file of this patent:

UNITED STATES PATENTS

| Number | Name | Date |
|---|---|---|
| 1,922,459 | Schmidt | Aug. 15, 1933 |
| 2,223,421 | Hubacher | Dec. 3, 1940 |